Feb. 23, 1954 W. H. SHELEY 2,669,888
APPARATUS FOR MACHINING AN INTERNAL CYLINDRICAL SURFACE
Filed Nov. 18, 1948
3 Sheets-Sheet 1

Inventor
Wayne H. Sheley
by Spencer Hardman and Fehr
his attorneys

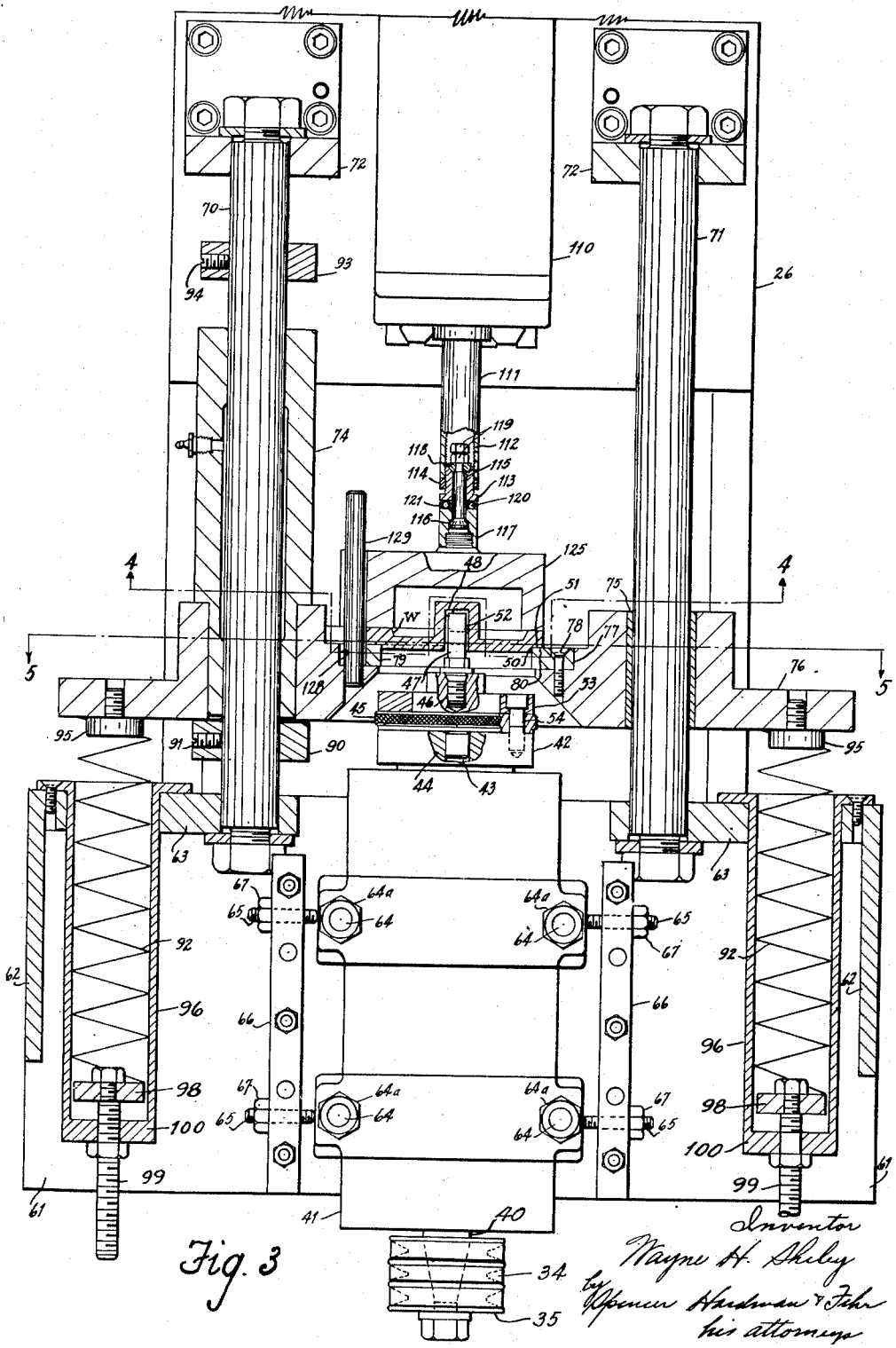

Feb. 23, 1954 W. H. SHELEY 2,669,888
APPARATUS FOR MACHINING AN INTERNAL CYLINDRICAL SURFACE
Filed Nov. 18, 1948 3 Sheets-Sheet 3
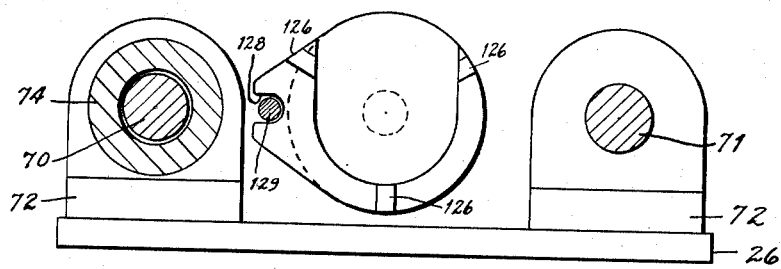
Fig. 4
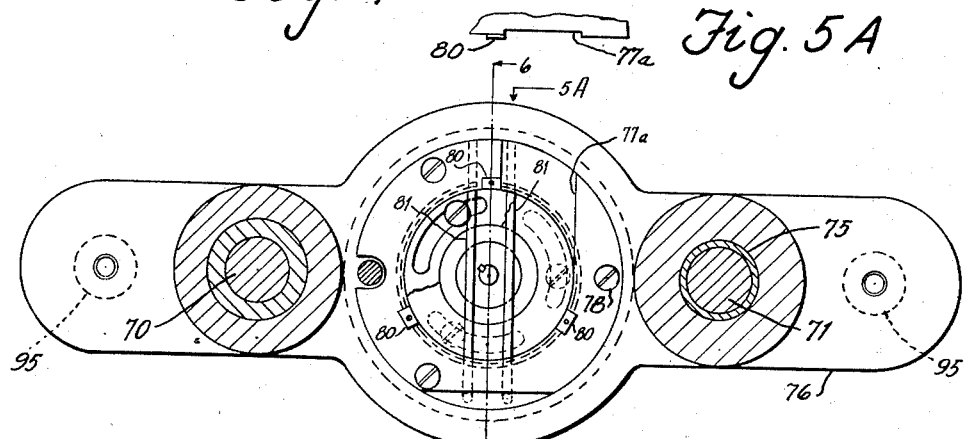
Fig. 5A
Fig. 5
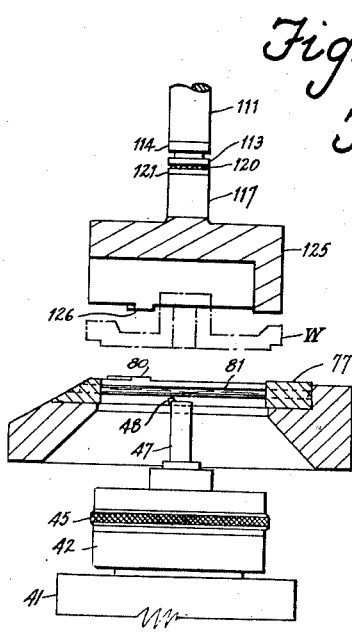
Fig. 6
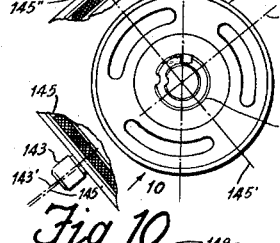
Fig. 9
Fig. 8
Fig. 10
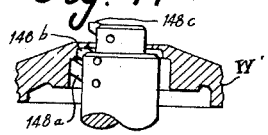
Fig. 11
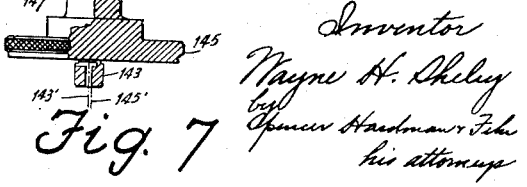
Inventor
Wayne H. Sheley
by Spencer Hardman & Fihu
his attorneys Patented Feb. 23, 1954

2,669,888

UNITED STATES PATENT OFFICE 2,669,888

APPARATUS FOR MACHINING AN INTERNAL CYLINDRICAL SURFACE

Wayne H. Sheley, Anderson, Ind., assignor to General Motors Corporation, Detroit, Mich., a corporation of Delaware Application November 18, 1948, Serial No. 60,686

1 Claim. (Cl. 77—4)

This invention relates to apparatus for counterboring metal pieces and its object is to provide a machine which will facilitate the finish cutting of a hole in a flat metal piece concentric to a finished cylindrical surface thereof. This machine provides a workholder having a cylindrical opening which receives the finished surface of the workpiece, a clamp which forces the piece against the holder and pushes the holder and workpiece together relative to a rotating cutting tool, said movement being opposed by springs which, during retraction of the clamp, return the workholder to normal position.

Further objects and advantages of the present invention will be apparent from the following description, reference being had to the accompanying drawings, wherein a preferred embodiment of the present invention is clearly shown.

In the drawings:

Figs. 1 and 1A together constitute a front view of the machine.

Fig. 3 is a sectional view on line 3—3 of Fig. 2.

Figs. 4 and 5 are sectional views, respectively, on lines 4—4 and 5—5 of Fig. 3.

Fig. 5A is a fragmentary view in the direction of arrow 5A of Fig. 5.

Fig. 6 is a sectional view on line 6—6 of Fig. 5 showing the workholder, workpiece and clamp.

Fig. 7 is a side view, partly in longitudinal section, of a three-bit cutter.

Fig. 8 is a plan view thereof.

Figs. 9 and 10 are fragmentary, side views taken in the direction of arrows 9 and 10, respectively, of Fig. 8.

Fig. 11 is a fragmentary, longitudinal, sectional view of a workpiece upon which the three-bit cutter operates.

Figure 1:
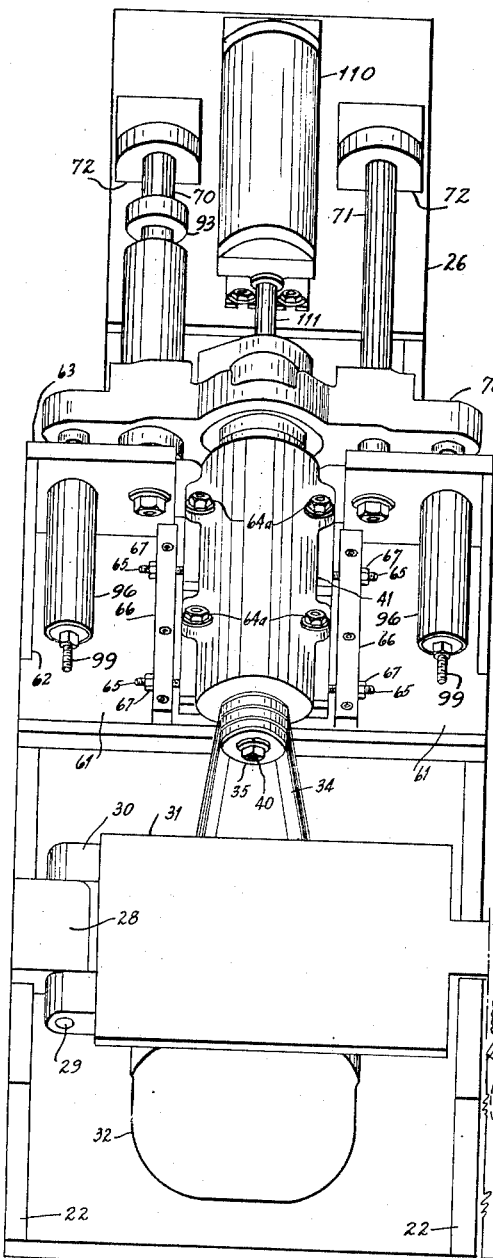
Figure 2:
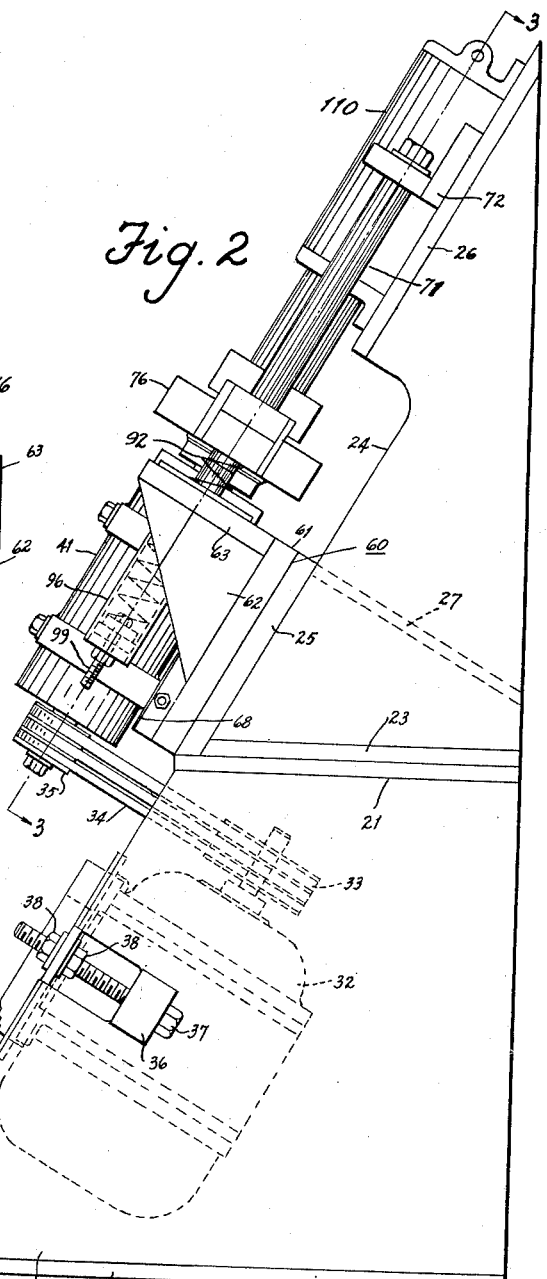
Fig. 2 is a side view thereof.

The machine frame shown in Figs. 1 and 2 comprises a base which includes horizontal plates 20 and 21 and side plates 22 which are welded together and a frame which includes a horizontal plate 23, side plates 24 and cross plates 25, 26, 27 which are welded together.

Figure 1A:
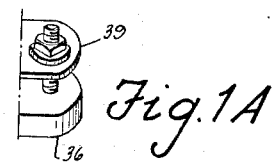

A plate 22 provides a hinge block 28 which a pin 29 connects with lugs 30 of a plate 31 which supports an electric motor 32 which drives a multigroove pulley 33 connected by belts 34 with a multigroove pulley 35. To the right of right plate 22 there extends an integral lug 36 (Figs. 1A and 2) which receives a screw 37 threaded through nuts 38 and passing through a lug 39 of plate 31. By adjusting the nuts 38, the plate 31 is adjusted relative to the hinge pin 29 and the belts 34 are tightened.

Pulley 35 (Fig. 3) drives a boring head having a shaft 40 journaled in a bearing frame 41 and driving a disc 42 having a hole 43 slightly eccentric (on the order of .004") to the axis of shaft 40 and receiving a cylindrical pilot 44 integral with a knurled disc 45 and eccentric thereto. Disc 45 has a tapped hole 46 coaxial with the periphery thereof into which is secured a stud 47 carrying a cutter bit 48 for finish cutting a hole in a workpiece W having previously finished cylindrical and plane surfaces 50 and 51 respectively, the plane surface 51 being a right angle to the axis of the cylindrical surface. The function of the bit 48 is to finish cut a cylindrical surface 52 concentric with cylindrical surface 50. The diameter of surface 52 is accurately determined by the angular position of disc 45 relative to disc 42. Disc 45 is clamped to disc 42 in the required position of angular adjustment by a ring 53 which screws 54 attach to disc 42. The boring head unit comprising frame 41, shaft 40 and disc 42 is a purchased unit.

To the plate 25 (Figs. 1 and 2) there is attached a bracket 60 comprising welded plates 61, 62 and 63. The bearing frame 41 (Fig. 3) is attached to plate 61 by nuts 64a and screws 64 which are attached to the plate 61 and which are received by holes in the frame 41, said holes being of such diameter as to permit lateral adjustment of the frame 41 relative to plate 61. This adjustment is effected by turning of screws 65 threaded through bars 66 attached to plate 61 and abutting the frame 41. Screws 65 are fixed in adjusted position by lock nuts 67. Lateral adjustment of frame 41 relative to plate 61 at right angle to the adjustment effected by screws 65 is effected by the use of shims 68 located around the studs 64 and between the frame 41 and the plate 61.

Plate 63 supports the lower ends of rods 70 and 71 parallel to the axis of shaft 40 having their upper ends supported by brackets 72 attached to plate 26. Rods 70 and 71 are received by bearing bushings 74 and 75, respectively, attached to a plate 76 which supports a workholder ring 77 attached by screws 78 and having a central bore 79 coaxial with shaft 40 and three equiangularly spaced bosses 80 having surfaces in the same plane at right angles to the axis of shaft 40. Bore 79 closely fits the cylindrical surface of the workpiece W and the plane surfaces of bosses 80 are engaged by the plane surface 51 of the workpiece. The ring 77 supports guard rods 81 which, in upper position of ring 77 as shown in Fig. 6, are above the cutter bit 48.

Plate 76 in its lower position is closely adjacent to a collar 90 which screws 91 secure to rod 70. Springs 92 urge the plate 76 upwardly to cause bushing 74 to engage a collar 93 which screws 94 secure to rod 70. Springs 92 are located by buttons 95 which are screwed into plate 76 and by tubes 96 having flanges 97 attached to plate 63. The lower ends of springs 92 press against discs 98 attached to screws 99 threaded through discs 100 attached to tubes 96. By turning the screws 99, the compression of springs 98 is adjusted and lock nuts 101 are tightened against discs 100.

Plate 26 supports a cylinder 110 of a servo motor such as described in the application of W. A. Fletcher, Serial No. 781,799, filed October 24, 1947, Patent No. 2,580,751, January 1, 1952. The rod 111 is connected with a piston in cylinder 110. Compressed air is admitted by a valve, not shown, to the upper side of the piston for downward movement of rod 111 or to the underside of the piston for upward movement of the rod. Downward movement of the rod 111 is retarded hydraulically to obtain a relatively slow feeding of the workpiece to the cutter bit and retraction of the rod is effected more rapidly by means disclosed in the Fletcher application. The rod 111 has a thread bore 112 engaged by a bushing 113 which is secured in the required position of axial adjustment by a lock nut 114. A screw 115 having a spherical head 116 passes through bushing 113 and a nut 117 attached to a clamp 125. Nut 117 has a spherical socket receiving the head 116 of screw 115. Bushing 113 has a spherical socket receiving a spherical washer 118 which nuts 119 clamp against a shoulder of the screw 115. Balls 120 in a cage 121 are located between the bushing 113 and the nut 117 and transmit motion downwardly from rod 111 to the clamp 125. This construction provides for lateral movement of the clamp 125 which, as shown in Fig. 4, has three equi-angularly spaced bosses 126 which are in alignment with bosses 80 of ring 77. Ring 77 has a recess 77a to provide clearance for a projecting part of the workpiece and clamp 125 has a recess 127 which receives another projecting part of the workpiece as shown in Fig. 3. To maintain alignment of the bosses 126 of clamp 125 with the bosses 80 of ring 77, clamp 125 has a notch 128 which receives a rod 129 attached to plate 76 (Fig. 3). The clearance between the rod 129 and the clamp 125 is such as not to interfere with the lateral movement of clamp 125 as provided by its connection with the rod 111. Therefore as the clamp is lowered into engagement with the workpiece on the ring 77, its three bosses 126 will bear substantially equally upon the upper surfaces of the workpiece which is forced by the clamp into contact with the bosses 80 of ring 77.

While the clamp 125 and the workholder ring 77 are up in the position shown in Fig. 6, the workpiece is inserted between them and is seated upon the ring 77. When compressed air is admitted to the upper side of the piston connected with rod 111, clamp 125 moves down to press the workpiece against the ring 77 (Fig. 3). Then the clamp and the ring move down together to cause the workpiece to be engaged by the rotating cutter bit 48 which finishes the cylindrical surface 52 of the workpiece concentrically with the cylindrical pilot surface 50 and at right angle to the plane surface 51 of the workpiece. As the workpiece is fed against the bit, the downward movement of the ring 77 is resisted by compression of the springs 92 whose initial compression can be adjusted by screws 99 to obtain, in conjunction with the hydraulic retarding means referred to, the proper rate of feed of the workpiece against the cutter bit.

The venting of the upper side of the piston connected with rod 111 and the admission of compressed air to the underside of said piston causes the ring 77, workpiece and clamp 125 to rise together and the separation of the clamp 125 from the workpiece W after the bushing 74 of plate 76 engages the upper stop collar 93. The machine attendant then unseats the workpiece from the ring and pushes it upon the plate 27 (Fig. 2) which serves as a chute to direct it toward a bin.

For machining a workpiece such as W' (Fig. 11), three bits 148a, 148b, 148c are used. These are mounted on a post 147 integral with a disc 145 corresponding to disc 45 (Figs. 3 and 6) having an eccentric pilot 143 corresponding to pilot 43. The eccentricity relation of pilot 143 to disc 145 is shown in Figs. 7-10 by dot-dash line 145' representing the center line of disc 145 and 143' representing the center line of pilot 43 143. This same relation exists between pilot 43 and disc 45. Mark 145'' on part 145 (Fig. 9) is an index cooperating with a scale (not shown) on part 42 to show the position of part 145 relative to part 42. Part 45 has a similar index mark.

While the embodiment of the present invention as herein disclosed, constitutes a preferred form, it is to be understood that other forms might be adopted.

What is claimed is as follows:

In a device of the character described the combination comprising, a workholder; clamping means for clamping a workpiece to said holder; stationary tooling means for operating on the workpiece; a pneumatic device for sequentially operating the clamping means and then while holding the workpiece in clamped position, advancing the workpiece toward the tooling means for accomplishing the desired result; and adjustable spring means cooperating with the workholder for opposing the movement of said pneumatic means toward said tool means said yieldable means including a plurality of tubular casing members each open at one end and spaced from the workholder, a spring fitted within each of said members and extending from the open ends of the members into engagement with said workholder for supporting the same, and adjustment means adjacent the closed ends of said members and adapted to be individually adjustable for varying the action of said mounting with respect to said workholder.

WAYNE H. SHELEY.

References Cited in the file of this patent

UNITED STATES PATENTS

| Number | Name | Date |
|---|---|---|
| 779,251 | Baggaley | Jan. 3, 1905 |
| 1,519,952 | Brown, Jr. | Dec. 16, 1924 |
| 1,553,602 | Edwards et al. | Sept. 15, 1925 |
| 1,582,639 | Cullen | Apr. 27, 1926 |
| 1,614,852 | Scharf | Jan. 18, 1927 |
| 2,373,379 | Brown | Apr. 10, 1945 |
| 2,388,621 | Sirp et al. | Nov. 6, 1945 |
| 2,426,124 | Skwierawski | Aug. 19, 1947 |
| 2,477,934 | Leland | Aug. 2, 1949 |